United States Patent

Povlsen et al.

[11] Patent Number: 5,870,183
[45] Date of Patent: Feb. 9, 1999

[54] METHOD OF MEASURING ON AN OPTICAL FIBRE

[75] Inventors: Jorn H. Povlsen, Holte; Claus F. Pedersen, Frederiksberg, both of Denmark

[73] Assignee: DSC Communications A/S, Ballerup, Denmark

[21] Appl. No.: 952,290

[22] PCT Filed: May 9, 1996

[86] PCT No.: PCT/DK96/00211

§ 371 Date: Jan. 23, 1998

§ 102(e) Date: Jan. 23, 1998

[87] PCT Pub. No.: WO96/35935

PCT Pub. Date: Nov. 14, 1996

[30] Foreign Application Priority Data

May 10, 1995 [DK] Denmark ................................ 0541/95

[51] Int. Cl.⁶ .................................................. G01N 21/88
[52] U.S. Cl. .......................................................... 356/73.1
[58] Field of Search ............................................ 356/73.1

[56] References Cited

U.S. PATENT DOCUMENTS 4,732,469  3/1988  Souma .
5,343,286  8/1994  Keeble et al. ........................ 356/73.1

FOREIGN PATENT DOCUMENTS

| 0591818 | 4/1994 | European Pat. Off. | ....... G01M 11/00 |
| 0623815 | 11/1994 | European Pat. Off. | ....... G01M 11/00 |
| 9015980 | 12/1990 | WIPO | ............................ G01M 11/00 |

*Primary Examiner*—Vincent P. McGraw
*Attorney, Agent, or Firm*—Baker & Botts, L.L.P.

[57] ABSTRACT

In a method of measuring on an optical fibre (2), a pulse is launched into the fibre, and the temporal course (8, 9) of the echo of this pulse is measured. Then, a signal level representing the background noise present in the fibre is subtracted in a subsequent signal processing of the echo signal. The signal level representing the present background noise is calculated on the basis of the instantaneous value (20) of the background noise which it assumes during the measurement of the echo signal. In a first embodiment the background noise is measured at a wavelength different from the wavelength of the emitted pulse. In a second embodiment wherein several successive pulses (25, 26) are launched into the fibre, optical power (27) is launched into the fibre at a wavelength other than the pulse wavelength during the intervals between said pulses.

13 Claims, 3 Drawing Sheets

METHOD OF MEASURING ON AN OPTICAL FIBRE

TECHNICAL FIELD OF THE INVENTION

The invention concerns a method of measuring on an optical fibre, wherein one or more pulses are launched into the fibre. The temporal course of the echo from this these pulses measured, and then a signal level representing the background noise present in the fibre is subtracted in the subsequent signal processing of the echo signal.

BACKGROUND OF THE INVENTION

In measurements of this type, which are used for locating cable breaks and for measuring transmission losses along optical fibres or fibre connections, it is possible to use e.g. an optical time domain reflectometer (OTDR) which is capable of measuring the attenuation variation along an optical fibre. This is performed precisely by measuring the temporal course of the echo from a pulse which is launched into the fibre. The range of the OTDR instrument, i.e. the length of the fibre on which measurements may be performed, is determined by the dynamic range of the instrument, as, of course, the echo signal becomes the weaker, the longer the distance it has travelled in the cable. Present OTDR instruments can typically have a range of the order of 100–200 km.

However, the development of erbium doped fibre amplifiers (EDFA) has made it possible to use fibre connections in which the fibres may be considerably longer than mentioned above. Accordingly, there is a need for enhancing the dynamic range of OTDR instruments or other corresponding instruments which measure on the echo from a pulse which is launched into the fibre. One way of enhancing the dynamic range of the instrument and thereby its range is to increase the power of the pulse which is launched into the fibre. It has been proposed to achieve this by using an optical fibre amplifier, such as e.g. an erbium doped fibre amplifier, which is arranged between the instrument and the fibre. Typically, such an optical amplifier will be capable of amplifying the signal in both directions so as to achieve amplification both of the pulse launched into the fibre and of the echo signal returning to the instrument from the fibre. Of course, it is also possible to employ the optical amplifiers already present in the fibre connection.

However, it has been found that even though the reflected signal is amplified hereby, the curve produced by the instrument and describing the attenuation as a function of the distance from the instrument, decreases sharply at a specific distance, which may typically be about 50 km. Thus, in reality, the range of the instrument is not enhanced, but, on the contrary, is diminished by the coupling of an optical fibre.

The problem involved by the combination of the optical measuring instrument and the optical amplifier is that the optical amplifier itself generates noise which interferes with the measurement. Amplifier noise is generated by the amplified spontaneous emission (ASE) in the amplifier. While OTDR instruments are adapted to correct for the background radiation, i.e. the noise, during the intervals between the signal pulses, said background noise being determined by measuring the background radiation without pulse exposure, but this require that the noise behaves ideally and independently of pulse exposure. This is not the case, as the ASE noise from the optical amplifier depends on the signal passing through the amplifier. This means that the noise emitted by the amplifier decreases abruptly when a pulse is emitted, and then it slowly increases to a dwell level during the interval between the pulses. As it is the dwell level noise which is calibrated for in the OTDR instrument, the noise level used will thus be greater than the noise which is actually present when the measure is made, as this takes place immediately after the emission of the pulse. As a too large value is thus subtracted from the measured signal level to compensate for the noise, the reflections originating from the most remote parts of the fibre, in other words the weakest signals, will be negative. As logarithmic values of the reflected signal are calculated in the calculations performed in the OTDR instrument, there will be no results for the negative signals. An OTDR instrument in which the noise is sampled in the intervals between the transmitted optical pulses and averaged over a number of pulses is disclosed in EP-A-0 591 818.

WO-A-90/15980 discloses an arrangement for OTDR measurements on a fibre in which an optical amplifier is utilized to amplify optical pulses before they are launched into the fibre under test as described above. Also, this arrangement suffers from the mentioned drawbacks. Thus, the instrument can just show the fibre attenuation curve out to the point where the reflected signals become negative in the measurement.

SUMMARY OF THE INVENTION

The invention provides a method which allows for the circumstance that noise from optical amplifiers in the fibre connection varies temporally in connection with the pulses emitted from a measuring instrument.

This is achieved by in a first method calculating the signal level representing the present background noise on the basis of an instantaneous value of the background noise measured during the echo pulse signal. When compensating for the noise in this manner by subtraction of a noise level corresponding to the noise actually present at the measurement time, instead of using an averaged noise level, it is ensured that the echo signal used in the calculations in the measuring instrument assumes positive values, and it has been found that the range of such a measuring instrument can hereby be enhanced considerably.

In an embodiment of the invention which is described in claim 2, this is achieved by measuring the background noise at a wavelength which is different from the wavelength of the emitted pulse. This is possible, as the noise spectrum is very wide with respect to the spectral width of the emitted pulse, and the noise level at the wavelength of the emitted pulse will therefore be the same as at adjacent wavelengths. When the noise level measurement is performed at another wavelength, then, as stated in claim 3, it is possible to perform the background noise measurement simultaneously with the measurement of the reflected echo signal, so that the noise is measured at the relevant time.

An expedient way of performing this measurement is achieved, as stated in claim 4, by splitting the echo signal into a first part which just comprises wavelengths in a narrow range around the wavelength of the emitted pulse, and a second part which comprises other wavelengths. The echo signal part then used in the signal processing is determined exclusively on the basis of the first part, while the background noise is determined exclusively on the basis of the second part. The two measurements may hereby be performed in separate circuits, so that they do not interfere with each other. As stated in claim 5, splitting of the echo signal may expediently take place by means of a wavelength coupler.

The best approximation of the relevant noise level is provided when, as stated in claim 6, the background noise is measured at a wavelength which is as close as possible to the wavelength of the emitted pulse. This minimizes noise level frequency variation, if any.

After the measurement of the echo signal and the background noise, respectively, it is possible either to perform the subsequent signal processing of the two signals separately, as stated in claim 7, or, as stated in claim 8, to mix the electric signals associated with the detections of the echo signal and the background noise, respectively, so that the electric background noise signal counteracts the actual noise on the echo signal.

In an alternative embodiment of the invention, which is described in claim 9, and wherein several successive pulses are launched into the fibre from the measuring apparatus, optical power is launched into the fibre during the intervals between said pulses at a wavelength other than the wavelength of the pulses and the signal level representing the present background noise is calculated on the basis of the value of the background noise measured during said intervals. When, in this manner, an optical amplifier is caused to be exposed also in the intervals, it is ensured that the temporal variation in the amplifier noise level is diminished considerably, thereby allowing a noise measurement which has not necessarily been made at the time when the reflecting pulse is measured, to be used in the compensation for the noise in the measuring instrument. The smallest temporal noise signal variation is achieved, when, as stated in claim 10, the two wavelengths are launched into the fibre with approximately the same power, so that the amplifier is exposed to approximately the same level.

Where the pulses are launched into the fibre via an optical amplifier, it will be expedient, as stated in claim 11, to select both wavelengths in the vicinity of the gain maximum of the gain of the optical amplifier. If, as stated in claim 12, the wavelengths are selected at their respective sides of said gain maximum, thereby making the gain of the optical amplifier identical for the two wavelengths, it is ensured that the noise level with the two wavelengths will substantially assume the same value.

The measurement of the echo of said pulses may expediently be performed by allowing the complete echo signal to pass through an optical filter which blocks the wavelength used during the intervals, as stated in claim 13.

This ensures that the two measurements may be performed separately.

BRIEF DESCRIPTION OF THE DRAWINGS

The invention will now be described more fully below with reference to the drawing, in which.

DETAILED DESCRIPTION OF THE INVENTION

Figure 1:
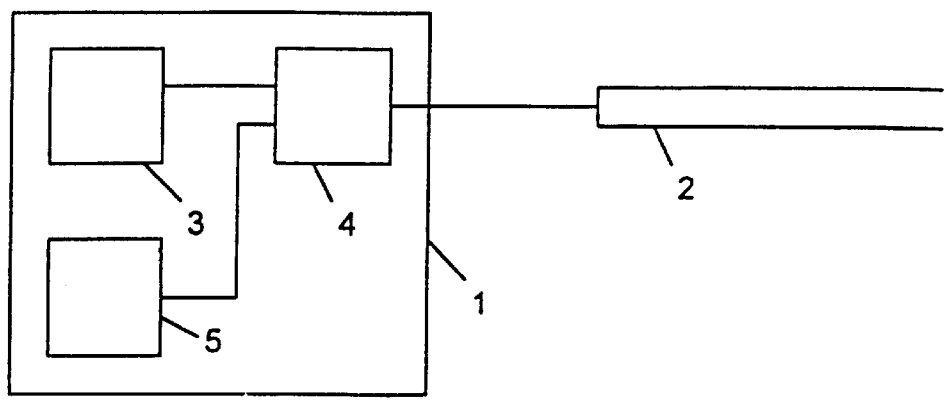
FIG. 1 shows a known OTDR instrument.

FIG. 1 shows an optical time domain reflectometer (OTDR) which is connected to an optical fibre 2. The optical fibre 2 is incorporated in a transmission line, and the OTDR instrument 1 is used for locating breaks or measuring transmission losses along the optical fibre 2. The OTDR instrument contains a pulse generator 3 which generates an optical pulse. This takes place most frequently by means of a laser. The optical pulse is passed from the pulse generator 3 via an optical coupler 4 to the fibre 2 and propagates along the latter. The echo reflected from the fibre 2 is passed via the optical coupler 4 to a receiver 5, which measures the temporal course of the echo and calculates the attenuation variation along the optical fibre 2 on the basis of said course. Attenuation may e.g. be shown as a curve on an oscilloscope.

Figure 2:
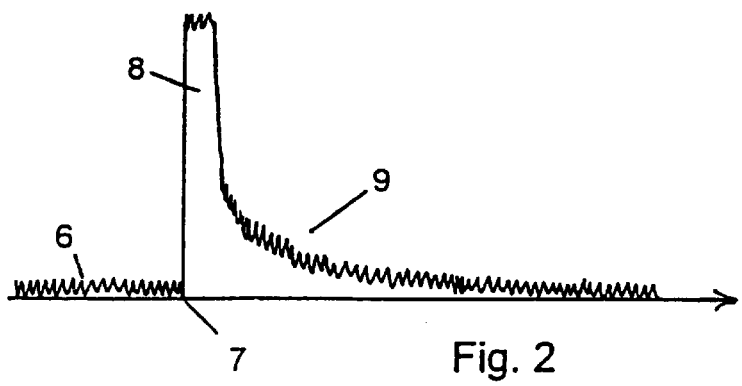
FIG. 2 shows the temporal course of an echo signal received by means of the instrument of FIG. 1, FIG. 3 correspondingly shows an attenuation curve for an optical fibre measured by the instrument of FIG. 1.

FIG. 2 shows an example of how the temporal course of such an echo can be. Prior to launching the pulse into the fibre 2, the receivers 5 just measure background noise 6. The pulse is launched at 7, and the first part of the echo 8 has a course corresponding to the pulse itself. Because of reflections from the fibre, the rear flank of the echo signal proceeds as shown at 9. The signal diminishes gradually here, and is of course attenuated the more, the longer it has traveled in the fibre 2. A given time during the course 9 thus corresponds to a specific distance in the fibre 2. The curve shown in FIG. 3 can therefore be obtained after signal processing, showing the attenuation along the cable as a function of the distance form the OTDR instrument 1. A perfect cable will give an evenly declining curve 10, since, as mentioned, the attenuation of the signal increases with the distance traveled by the pulse in the fibre 2. It will be seen that at a certain distance 11 the curve disappears in noise 12, and the distance 11 is thus indicative of the range of the instrument. The distance corresponding to the point 11 will typically be 100–200 km with the instruments of today. An error in the cable will be reflected by an irregularity in the curve 10, and the curve can thus indicate the distance where an error is to be searched for.

Figure 4:
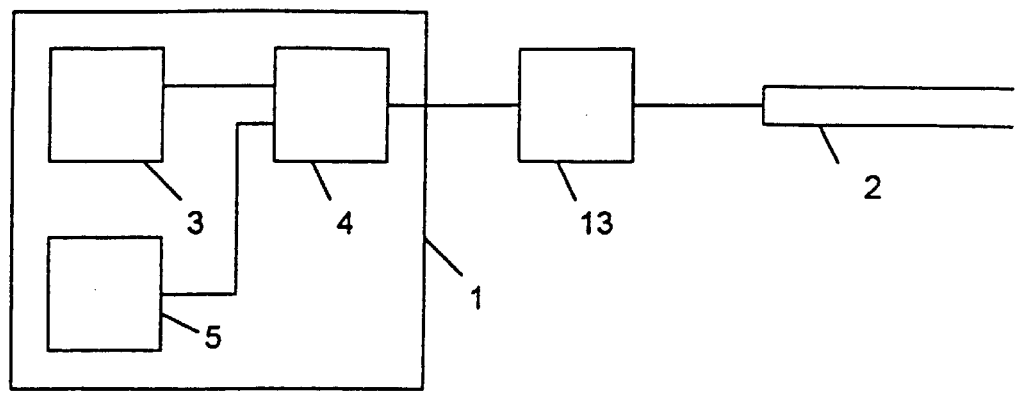
FIG. 4 shows an OTDR instrument combined with an optical fibre amplifier.

FIG. 4 shows a situation where an optical amplifier 13 is interposed between the OTDR instrument 1 and the fibre 2. It may e.g. be an erbium doped fibre amplifier (EDFA). The amplifier 13 serves as an amplifier on the pulse emitted from the OTDR instrument 1 as well as on the echo signal reflected from the fibre. In addition to serving as an amplifier, the optical amplifier 13 also has the property of adding to the signal a certain amplification noise which originates from the amplified spontaneous emission (ASE) in the amplifier.

Figure 3:
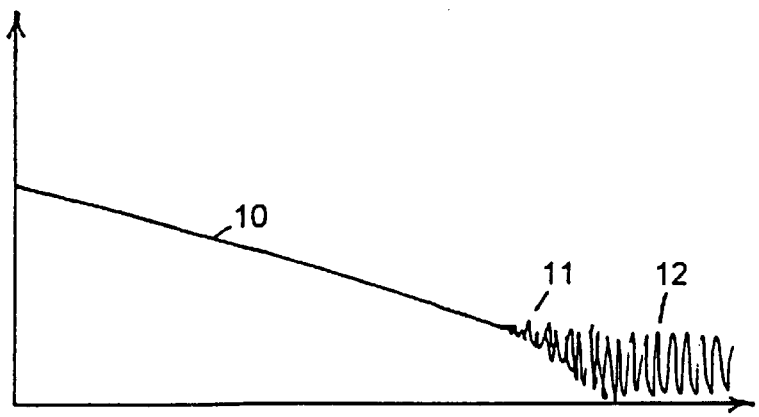
Figure 5:
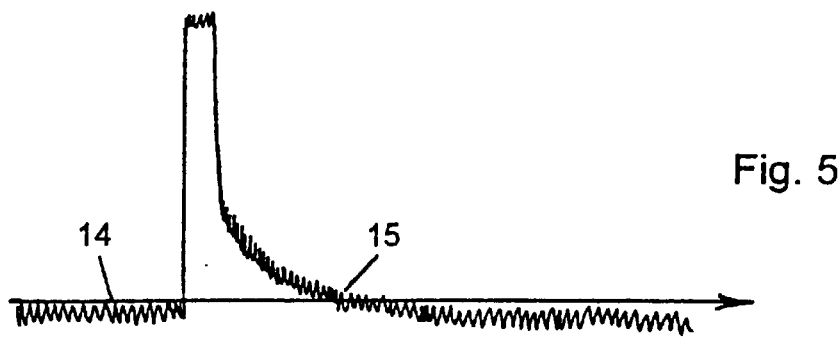
FIG. 5 shows the temporal course of an echo signal received by means of the array of FIG. 4.
Figure 6:
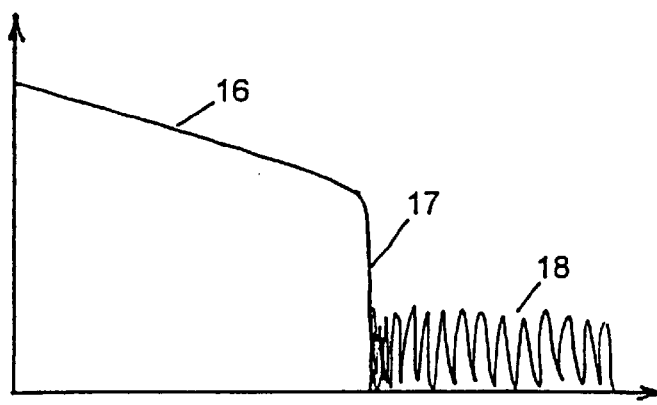
FIG. 6 shows the attenuation course of the optical amplifier and fibre combination of FIG. 4.

FIGS. 5 and 6 correspond to FIGS. 2 and 3, with the addition of the optical amplifier 13. FIG. 5 thus shows the temporal course of the echo signal received from the fibre 2, while FIG. 6 shows the attenuation in the fibre as a function of the distance from the instrument. It will be seen that the background noise 14 is apparently negative, and that the echo signal correspondingly assumes negative values after the point 15. This will be explained below. In general, the curve of FIG. 15 corresponds completely to the curve shown in FIG. 2, except that the level is higher because of the amplifier 13.

Thus, the higher signal level has a result that the curve 16 in FIG. 6 starts from a higher level. It would thus be expected that this curve would cover a greater range before disappearing in noise like at 11 in FIG. 3. However, as will be seen, this is not the case, as it decreases sharply at 17, and then only the noise signal 18 is left. The distance corresponding to the point 17 can typically be about 50 km. The point 17, where the attenuation curve decreases sharply, corresponds to the point 15 on the time axis of FIG. 5, where the temporal course is of the echo signal begins to assume negative values. The reason is that the attenuation curve of FIG. 6 shows logarithmic values of the reflected signal, and the curve will therefore disappear when the signal assumes negative values. Instead of achieving an enhanced range by adding the optical amplifier 13, a decease has thus been obtained in reality. This is caused by the ASE noise emitted from the amplifier 13.

Figure 7:
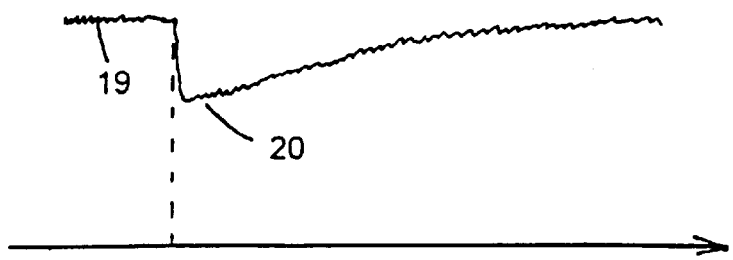
FIG. 7 shows an example of the temporal course of the noise from an optical amplifier.

The OTDR instrument is adapted to compensate for a certain background noise. This is done by averaging the measured noise, e.g. as seen at 6 in FIG. 2, during a time span prior to launching the optical pulses into the fibre 2. The level of this background noise can then be subtracted when the reflected echo signal is then signal-processed in the instrument. However, this requires that the noise level during the measurement is the same as it was prior to the measurement, where the instrument determined the value which was subsequently subtracted. However, this is not the case for the ASE noise generated by the amplifier 13, as the strong pulse from the OTDR instrument will interfere with the noise emission of the amplifier temporally. FIG. 7 shows an example of how the ASE noise may vary temporally when the pulse is launched into the fibre. The time axis in FIG. 7 corresponds to the one used in FIG. 5.

The explanation of this temporal variation of the ASE noise is that an optical erbium fibre amplifier operates in that erbium ions excited to a semi-stable upper laser level with pump light can decay to the base state by stimulated interaction with the signal. A photon is added to the signal for each stimulated decay. In case of a signal pulse having N photons, the signal pulse will have a photon growth of (G-1) N photons on the output of the amplifier. As this photon growth takes place at the expense of a corresponding number of deexcitations of erbium ions from upper state to base state, the number of excited erbium ions will decrease by a time constant given by the passage time of the pulse through the amplifier. After this deexcitation, the amplifier noise will decrease because of the fewer excited ions, and the pump light will begin to pump the deexcited ions up into the upper level again. The up-excitation follows a curve which exponentially approaches the dwell state value by a time constant which is in the millisecond range. The amount of excited ions will thus temporally have a serrated course with sudden plunges where an OTDR pulse passes the amplifier, and slow increases in the intervals between the OTDR pulses. The noise emitted from the amplifier will exhibit a qualitatively similar course.

This means that prior to the launching of the pulse the noise level assumes a higher level 19 than the actual noise level 20 at the time when the measurement of the echo signal is performed. As mentioned above, however, it is the level 19 prior to the pulse which the OTDR instrument uses as the noise level which is subtracted from the measured echo signal before the attenuation curve is generated. As the noise level 20 is smaller than the noise level 19, a too great level will thus be subtracted from the echo signal, causing the signal, as shown in FIG. 5, to assume negative values, so that the attenuation signal disappears, as shown in FIG. 6.

Figure 8:
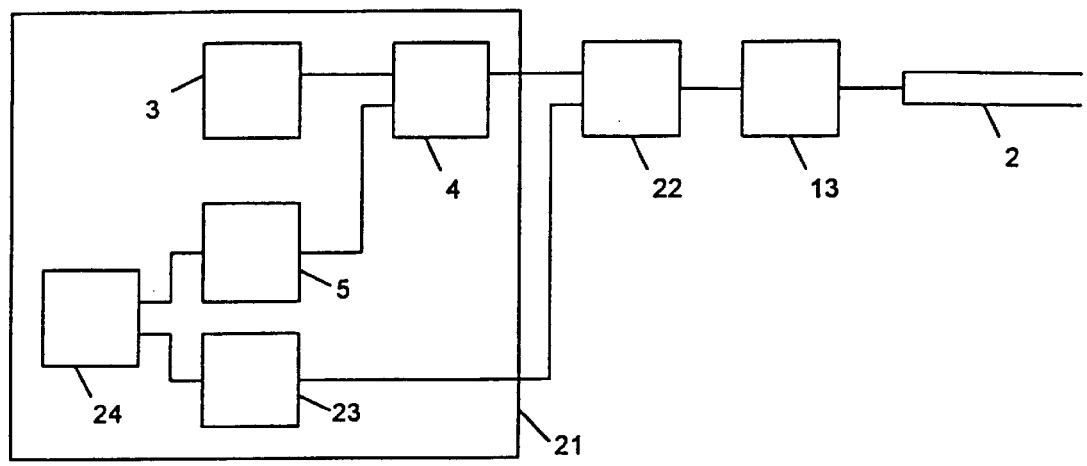
FIG. 8 shows an array according to the invention using a wavelength coupler.

FIG. 8 shows an array capable of remedying this problem. The OTDR instrument 21 shown her [sic], like the instrument 1, contains a pulse generator 3, an optical coupler 4, and a receiver 5. Like before, the pulse is launched into the optical fibre 2 via an optical amplifier 13. A wavelength coupler 22 is interposed between the OTDR instrument 21 and the optical amplifier 13 and is selected such that the pulse, which consists of light having a predetermined wavelength, is just transmitted to the arm which leads into the fibre length. When meeting the wavelength coupler 22, the returning light will be split, so that the emitted pulse, is passed to the optical coupler 4 as usual and from there further on to the receiver 5. Other wavelengths will instead be passed from the wavelength coupler 22 to a noise measuring circuit 23. The noise spectrum of the optical erbium fibre amplifier 13 is very wide with respect to the spectral width of the employed pulse signal source, and this means that, with very great approximation, the amplifier ASE noise will assume the same noise level at the emitted pulse wavelength as at the surrounding wavelengths. Since, having passed the wavelength coupler 22, the surrounding wavelengths reach the noise measuring circuit 23, it is possible, in said circuit, to measure a noise level corresponding to the noise which is contained in the echo signal which was supplied to the receiver 5 after the passage of the wavelength coupler 22. The measurement of the noise level can now be performed in the noise measuring circuit 23 at the right time, which is shown at 20 in FIG. 7, thereby ensuring that it is a more correct noise signal which is subtracted from the echo signal received. The actual subtraction takes place in the signal processing circuit 24. Here, it may be decided to process the two measurements separately and then subtract the noise signal purely digitally in the representation of the attenuation curve, or to mix the two signals and then perform the signal processing like in the traditional OTDR instrument 1. In the latter case, the electric signal from the noise measurement counteracts the actual ASE noise in the signal received. Of course, it is an advantage to perform the noise measurement in the noise measuring circuit 23 at a wavelength which is as close as possible to the pulse wavelength, as this best allows for a possible variation in the noise as a function of the wavelength.

Figure 9:
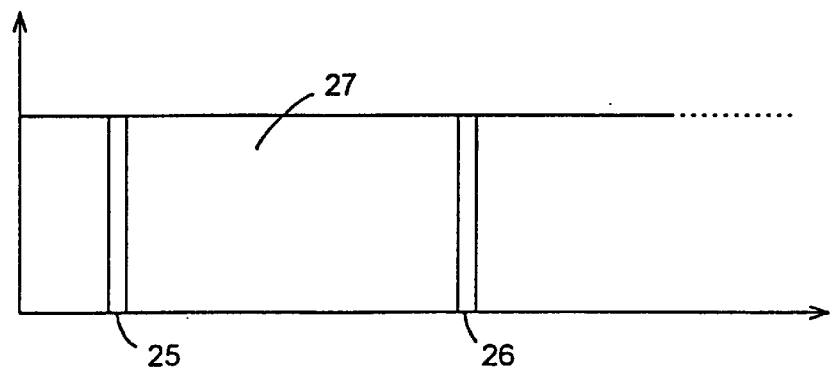
FIG. 9 shows how an interval between two pulses may be filled with optical power.

FIG. 9 shows the basic principle of an alternative embodiment of the invention. This embodiment may be applied when several successive pulses are launched into the fibre 2. As described below, the problem is that the ASE noise emitted by the optical fibre amplifier 13 depends on the amount of light passing the amplifier. In this embodiment, the OTDR instrument is adapted to apply optical power to the fibre also during the intervals between the emitted pulses, the emission being merely at a wavelength other than the one used for the pulses. FIG. 9 shows two pulses 25, 26, and it will be seen that an optical signal 27 having approximately the same power as the signal in the pulses 25, 26 is emitted between the pulses.

Figure 10:
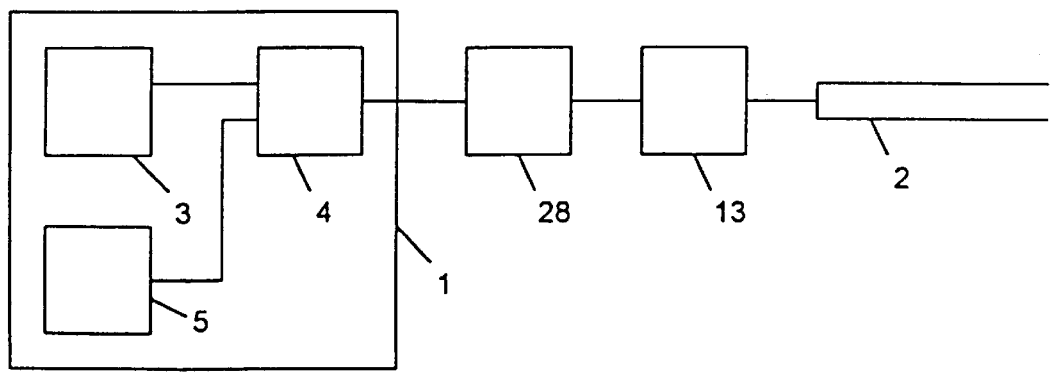
FIG. 10 shows an array with an optical filter capable of blocking optical power having a deviating wavelength.

FIG. 10 shows how this embodiment may be realized. The array corresponds to the one shown in FIG. 4, an optical filter 28 being merely interposed between the OTDR instrument 1 and the fibre amplifier 13. This filter 28 is adapted so as to allow all wavelengths to pass in a direction from the OTDR instrument to the fibre 2, and to block the wavelength used in the interval 27 in the opposite direction. As the optical amplifier 13 is now constantly passed by the same optical power, the ASE noise generated in the amplifier will now be constant and no longer assume the shape shown in FIG. 7. This means that the traditional OTDR instrument may be used unchanged, as the noise measurement performed by the instrument prior to launching of each pulse will give a correct picture of the noise present at the measuring time.

An expedient selection of the two frequencies may be found by means of the considerations below. The fraction X of erbium ions excited t the upper level, is called inversion, and it is controlled by the following rate equation $$\frac{\partial}{\partial t} x \int [(1-x)\gamma_e + x\gamma_a] P(v) dv - \frac{x}{\tau}$$

where $\gamma_e$ and $\gamma_a$ are the spectral emission and absorption strengths, $\tau$ the spontaneous lifetime and P(v) the spectral power density. The inversion change rate is 0 in the dwell state. If the spectral power density is changed suddenly, e.g. because an OTDR pulse passes, the inversion will be put out of the stable state. If the deviation from the stable state is called $\Delta x$, this will change at the rate $$\frac{\partial}{\partial t} \Delta x = [(1-x)\gamma_e - \gamma_a] \Delta P$$

The quantity in the square brackets corresponds to the gain of the fibre amplifier 13, and the change in inversion thus takes place most rapidly where the fibre amplifier has its maximum gain. Around this maximum gain, on the other hand, the inversion change will be insensitive to the exact frequency/wavelength location of the signal. Therefore, if the OTDR instrument is allowed to operate in the close vicinity of such a gain peak, the inversion fluctuations may be eliminated by filling the intervals between the OTDR pulses with optical power at another wavelength in the vicinity of the gain peak. The optimum wave length will here be the wavelength at the other side of the gain peak with the same gain as the signal.

The foregoing includes examples of how a measurement may be performed according to the invention, and it will be appreciated that details may be modified in a number of aspects within the scope of the invention. Thus, the invention may e.g. be implemented with other types of instruments than the OTDR instrument described here, just as the described optical filters and wavelength couplers may be replaced by other optical components.

What is claimed is:

1. A method of measuring on an optical fibre (2), wherein a pulse is launched into the fibre, and the temporal course (8, 9) of the echo from said pulse is measured, following which a signal level representing the background noise present in the fibre is subtracted in a subsequent signal processing of the echo signal, characterized by calculating the signal level representing the present background noise on the basis of an instantaneous value (20) of the background noise measured during the echo pulse signal.

2. A method according to claim 1, characterized by measuring the background noise at a wavelength which is different from the wavelength of the emitted pulse.

3. A method according to claim 1, characterized by performing the measurement of the echo signal and the background noise at the same time.

4. A method according to claim 2, characterized by splitting the echo signal into a first part which just comprises wavelengths in a narrow range around the wavelength of the emitted pulse, and a second part which comprises other wavelengths, and determining the echo signal used in the signal processing exclusively on the basis of the first part, and determining the background noise exclusively on the basis of the second part.

5. A method according to claim 4, characterized by splitting the echo signal by means of a wavelength coupler (22).

6. A method according to claim 2, characterized by measuring the background noise at a wavelength which is as close as possible to the wavelength of the emitted pulse.

7. A method according to claim 2, characterized by separately performing the measurements of the echo signal and the background noise, respectively, and the subsequent signal processing thereof.

8. A method according to claim 2, characterized by mixing the electric signals associated with the detections of the echo signal and the background noise, respectively, so that the electric signal from the background noise counteracts the actual noise on the echo signal.

9. A method of measuring on an optical fibre (2), wherein several successive pulses are launched into the fibre, and the temporal course (8, 9) of the echo from said pulses is measured, following which, a signal level representing the background noise present in the fibre is subtracted in a subsequent signal processing of the echo signal, characterized by launching optical power (27) into the fibre at a wavelength other than the pulse wavelength during the intervals between said pulses and by calculating the signal level representing the present background noise on the basis of a value (20) of the background noise measured during said intervals.

10. A method according to claim 9, characterized by launching the two wavelengths into the fibre with approximately the same power.

11. A method according to claim 9, wherein the pulses are launched into the fibre via an optical amplifier (13), characterized by selecting both wavelengths in the vicinity of a gain maximum of the gain of the optical amplifier.

12. A method according to claim 11, characterized by selecting the two wavelengths at their respective sides of said gain maximum so that the gain of the optical amplifier is the same at the two wavelengths.

13. A method according to claim 9, characterized by measuring the echo from said pulses by passing the complete echo signal into an optical filter (28) which blocks said other wavelength.

* * * * *